United States Patent [19]
Wilde et al.

[11] Patent Number: 5,850,375
[45] Date of Patent: Dec. 15, 1998

[54] SYSTEM AND METHOD USING OPTICAL FIBERS IN A DATA STORAGE AND RETRIEVAL SYSTEM

[75] Inventors: Jeffrey P. Wilde, Mountain View; Jerry E. Hurst, San Jose; John F. Heanue, Fremont, all of Calif.

[73] Assignee: Seagate Technology, Inc., Scotts Valley, Calif.

[21] Appl. No.: 771,057

[22] Filed: Dec. 20, 1996

Related U.S. Application Data

[60] Provisional application No. 60/022,775, Jul. 30, 1966, and provisional application No. 60/023,476, Aug. 6, 1996, and provisional application No. 025,801, Aug. 27, 1996.

[51] Int. Cl.$^6$ .................................................. G11B 13/00
[52] U.S. Cl. ............................................. 369/14; 369/112
[58] Field of Search .............................. 369/14, 13, 112, 369/30, 34, 36; 359/188; 385/100

[56] References Cited

U.S. PATENT DOCUMENTS

| | | | |
|---|---|---|---|
| 3,737,236 | 6/1973 | Borrelli .................................. | 356/118 |
| 4,135,083 | 1/1979 | Van Alem ............................... | 250/201 |
| 4,298,245 | 11/1981 | Aulich ................................... | 350/96.29 |
| 4,337,531 | 6/1982 | Willemson .............................. | 369/45 |
| 4,510,544 | 4/1985 | Lazzari .................................. | 360/114 |
| 4,539,519 | 9/1985 | Ulrich et al. ......................... | 324/117 R |
| 4,581,529 | 4/1986 | Gordon ................................... | 250/227 |
| 4,609,871 | 9/1986 | Bobb ...................................... | 324/244 |
| 4,626,679 | 12/1986 | Kuwayama et al. ................... | 250/227 |
| 4,683,421 | 7/1987 | Miller et al. .......................... | 324/96 |
| 4,740,951 | 4/1988 | Lizet et al. ............................ | 370/3 |
| 4,771,415 | 9/1988 | Taki ....................................... | 369/112 |
| 4,796,226 | 1/1989 | Valette ................................... | 365/122 |
| 4,799,210 | 1/1989 | Wilson et al. ......................... | 369/110 |
| 4,806,885 | 2/1989 | Morimoto .............................. | 332/7.51 |
| 4,847,823 | 7/1989 | Lindow ................................. | 369/110 |
| 4,866,372 | 9/1989 | Aoshima et al. ...................... | 324/96 |
| 5,033,043 | 7/1991 | Hayakawa .............................. | 369/121 |
| 5,034,679 | 7/1991 | Henderson et al. ................... | 324/96 |
| 5,039,220 | 8/1991 | Arditty et al. ......................... | 356/345 |
| 5,119,361 | 6/1992 | Tanabe .................................. | 369/121 |

(List continued on next page.)

OTHER PUBLICATIONS

Barnes, et al. "Use of optical fiber heads for optical disks," Applied Optics vol. 25, No. 22 Nov. 1986 pp. 4010–4012, Nov. 15, 1986.

Opsasnick, et al. "Optical Fibers for Magneto–Optical Recording," SPIE vol. 1499 1991 pp. 238–246 (no month available).

Garvey, et al. "Single–Mode Nonlinear–Optical Polymer Fibers" J. Optical Society Am. B. vol. 13 No. 9 Sep. 9, 1996 pp. 2017–2023.

3M Corp. "Introduction to Polarization Maintaining Fibers" 3M Specialty Fiber Sales Publication 78–6900–3455–4 rev. A 1995 (no month available).

K.S. Lau, Engineering Laboratory Notes insert to Aug. 1996 Issue of Optics and Photonics News (OPN) "An economical piezoelctric phase modulator for fiber optic sensors".

Opsasnick, et al. "Optical Fibers for Magneto–Optical recording," SPIE vol. 1499 1991 pp. 276–280 (no month available).

Renard et al., "Magneto Optical Reading an Writing Integrated Heads . . . " SPIE vo. 1499 pp. 238–247 (no month available).

*Primary Examiner*—Tan Dinh
*Attorney, Agent, or Firm*—Mark A. Wardas; Flehr Hohbach Test Albritton & Herbert LLP

[57] ABSTRACT

An optical system and method for transmission of light between a RF modulated source of light and a magneto-optical storage location along an optical path including: orthogonally aligned first and second single-mode polarization maintaining optical fibers, a flying magneto-optical head, and a quarter-wave plate positioned on the flying magneto-optical head.

37 Claims, 8 Drawing Sheets

U.S. PATENT DOCUMENTS

| | | | |
|---|---|---|---|
| 5,135,295 | 8/1992 | Jen et al. | 385/13 |
| 5,137,359 | 8/1992 | Steele | 356/350 |
| 5,152,597 | 10/1992 | Barnard | 359/130 |
| 5,191,387 | 3/1993 | Ichikawa | 356/34 |
| 5,212,583 | 5/1993 | Vali et al. | 359/245 |
| 5,218,582 | 6/1993 | Marchant | 369/14 |
| 5,229,834 | 7/1993 | Lequime | 356/365 |
| 5,245,491 | 9/1993 | Horie et al. | 360/114 |
| 5,255,260 | 10/1993 | Yamada et al. | 369/179 |
| 5,311,360 | 5/1994 | Bloom et al. | 359/572 |
| 5,383,048 | 1/1995 | Seaver | 359/279 |
| 5,446,574 | 8/1995 | Djupsjobacka | 359/181 |
| 5,477,323 | 12/1995 | Andrews et al. | 356/345 |
| 5,483,607 | 1/1996 | O'Keefe | 385/11 |
| 5,493,220 | 2/1996 | Oliver et al. | 324/209 |
| 5,619,488 | 4/1997 | Ota et al. | 369/112 |
| 5,633,959 | 5/1997 | Nike | 385/11 |

| Layer | Material | n | k | Optical Thickness nd/λ | Thickness λ=680nm |
|---|---|---|---|---|---|
| Incident Medium | Air | 1.0 | 0 | | |
| 1 | ZnS | 2.2948 | 0 | .43141 | 127.8 |
| 2 | SiO2 | 1.463041 | 0 | .34026 | 158.1 |
| 3 | ZnS | 2.2948 | 0 | .32126 | 95.2 |
| 4 | SiO2 | 1.463041 | 0 | .26916 | 125.1 |
| 5 | ZnS | 2.2948 | 0 | .30591 | 90.6 |
| 6 | SiO2 | 1.463041 | 0 | .30298 | 140.8 |
| 7 | ZnS | 2.2948 | 0 | .33003 | 97.8 |
| 8 | SiO2 | 1.463041 | 0 | .30665 | 142.5 |
| 9 | ZnS | 2.2948 | 0 | .31543 | 93.5 |
| 10 | SiO2 | 1.463041 | 0 | .31801 | 147.8 |
| 11 | ZnS | 2.2948 | 0 | .29563 | 87.6 |
| 12 | SiO2 | 1.463041 | 0 | .29544 | 137.3 |
| Substrate | Au | 0.1354 | 3.6548 | | |

*FIG. 8*

SYSTEM AND METHOD USING OPTICAL FIBERS IN A DATA STORAGE AND RETRIEVAL SYSTEM

CROSS REFERENCE TO RELATED APPLICATIONS

This application claims the benefit of: Provisional Application Serial No. 60/022,775, entitled "A Data Storage And Retrieval System Based On A Flying Magneto-Optical Head," filed on Jul. 30, 1996; Provisional Application Serial No. 60/023,476, entitled "A Data Storage And Retrieval System Based On A Flying Magneto-Optical Head," filed on Aug. 6, 1996; and Provisional Application Serial No. 60/025,801, entitled "A Data Storage And Retrieval System Based On A Flying Magneto-Optical Head," filed on Aug. 27, 1996. The present application further relates to U.S. patent application Ser. No. 08/731,214 entitled "Flying Optical Head With Dynamic Mirror" filed on Oct. 10, 1996. The subject matter of each of these related applications is incorporated herein by reference. All related applications are commonly assigned.

BACKGROUND OF THE INVENTION

1. Field of the Invention

The present invention relates generally to noise reduction in data storage and retrieval systems and more particularly to noise reduction in magneto-optical data storage and retrieval systems that use polarization maintaining optical fibers.

2. Background Art

In today's technological society, as the amount of information continues to grow, storage and retrieval of the information will play an increasingly important role. In a particular information storage technology known as magneto-optical (MO) data storage and retrieval, a long term goal continues to be improved access to this information. Information access includes the use of polarized laser light for reading and/or writing information at a mark of interest on an MO disk. In the case of reading information, MO technology makes use of a magneto-optical effect ("Kerr" effect) to detect a polarization rotation imposed on a linearly polarized incident laser beam by a surface recording layer at the mark of interest. The polarization rotation (representing the information stored at the mark of interest) is embodied in a reflection of the linearly polarized laser beam and is converted by electronics for readout. Consequently, to accurately read stored information from an MO disk, the polarization rotation of the reflected laser beam should be faithfully conveyed from the MO disk to the readout electronics as a signal that is both an accurate representation of the signal and with as large a signal-to-noise ratio as possible.

In one prior art proposal, S. Renard and S. Vallette (SPIE Vol. 1499, Optical Data Storage 1991, pp. 238–247) disclose an MO head design that requires three optical fibers to read and write information. Renard's MO head design is made undesirably complex, primarily, because of the large number of optical and compensation elements used in its implementation. In approaches that use polarization maintaining (PM) optical fibers, the intrinsic properties of the fiber can be made to preserve the optical polarization that is required for reading information from MO disks. Because PM optical fiber generally exhibits birefringence (i.e., a different refractive index that different polarization orientations experience), external stresses or temperature variations may function to induce unwanted fluctuations in the properties of the PM optical fiber. Consequently, any information conveyed by the Kerr polarization rotation as it propagates through the PM optical fiber may also be affected.

A proposal for passively eliminating phase fluctuations caused by the properties of PM optical fiber is discussed by M. N. Opsasnick in SPIE Vol. 1499, Optical Data Storage 1991, pp. 276–278. Opsasnick discusses passing a linearly polarized light through various optical elements so as to compensate for the birefringent effects of the PM optical fibers. As in the design of Renard and Vallette, the Opsasnick MO head and actuator arm design is limited by the physical size, mass, and the number of required optical elements.

A second approach proposed by N. Yamada (U.S. Pat. No. 5,255,260) is based on flying head optical technology that uses free-space optical propagation to and from an optical head. In particular, Yamada discloses an optical head arrangement that requires a stationary laser/detector package. In Yamada, the head is placed on a linear actuator for movement across a disk surface. Yamada does not address the problems associated with vertical runout of the disk or the associated degradation of the optical spot size. Although Yamada provides access to a plurality of phase change optical disks, the number of optical disks that may be operated within a given volume, as well as the performance characteristics associated with the optical disks, is inherently limited by the excessive number and size and cost of the required optical and mechanical components.

In general, the greater the number and mass of the optical elements used to access information in an MO data storage and retrieval system, the slower the speed at which the information may be accessed, the lower the tracking bandwidth becomes, and the lower the track density that may be read or written. What is needed, therefore, is an optical system and method that improves upon the prior art efforts directed towards data access. Compared to the prior art, the optical system and method should preferably reduce head weight and size, improve disk access time, require fewer optical components, increase the number of storage disks that may be operated within a given volume, and operate with improved signal-to-noise ratio.

SUMMARY OF THE INVENTION

The present invention comprises one or more optical paths for propagation of light between a source of light and a storage location. Each of the optical paths may include one or more optical fibers comprising a first segment and a second segment. The first and second segments may be coupled together so that an optical orientation axis of the first segment is aligned orthogonally to an optical orientation of the second segment. The first and second segments may be single-mode polarization maintaining optical fibers and their optical orientation axes may be a fast axis. The source of light may be a RF modulated laser source and the storage location may be a magneto-optical storage location. In the present invention an optical fiber may be coupled to a rotary actuator arm, and the rotary actuator arm may include a magneto-optical head. The optical fiber may be coupled to the magneto-optical head, and the magneto-optical head may include a polarization altering element. In the present invention the polarization altering element may be a quarter-wave plate. The magneto-optical head may further include a reflective substrate and an optical element. In the present invention the quarter-wave plate may be located in the optical path before or after the optical element. The quarter-wave plate may a discrete element or may be a multi-layer stack deposited on the reflective substrate. The present invention may further include an optical switch. The optical switch may be positioned in the optical path to selectively direct (between the source and the storage location) the light and a reflection of the light.

BRIEF DESCRIPTION OF THE DRAWINGS

FIG. 8 is a table illustrating the multi-layers of an exemplary reflective quarter-wave plate.

DETAILED DESCRIPTION OF THE PREFERRED EMBODIMENTS

Figure 1:
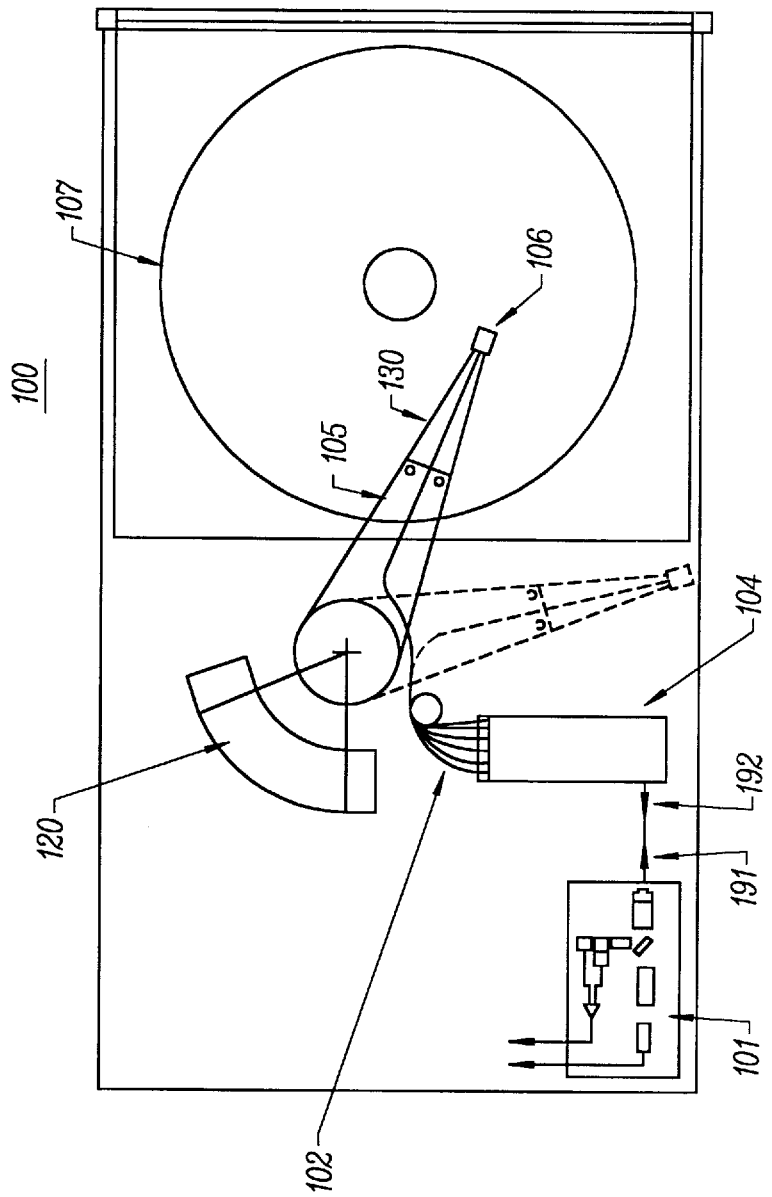
FIG. 1 is a diagram showing a magneto-optical data storage and retrieval system.

FIG. 1 is a diagram showing a magneto-optical data storage and retrieval system. In a preferred embodiment, magneto-optical (MO) data storage and retrieval system 100 includes a set of Winchester-type flying heads 106 that are adapted for use with a set of spinning MO disks 107 (one head for each MO disk surface). The set of flying heads 106 (hereinafter referred to as MO heads) are coupled to a rotary actuator magnet and coil assembly 120 by a respective suspension 130 and actuator arm 105 so as to be positioned over the surfaces of the set of spinning MO disks 107. In operation, lift forces are generated by aerodynamic interactions between the set of MO heads 106 and the spinning MO disks 107. The lift forces are opposed by equal and opposite spring forces applied by the set of suspensions 130. In the preferred embodiment, the set of MO heads 106 are maintained at a predetermined flying height over a full radial stroke of the rotary actuator assembly 120 above and below both surfaces of the set of spinning MO disks 107. In the preferred embodiment, system 100 is designed in such a way that under normal operating conditions the set of MO heads 106 never directly contact the set of spinning MO disks 107.

System 100 further includes: a laser-optics assembly 101, an optical switch 104, and a set of single-mode PM optical fibers 102. In the preferred embodiment, each of the set of single-mode PM optical fibers 102 are respectively coupled through a respective one of the set of actuator arms 105 and set of suspensions 130 to a respective one of the set of MO heads 106. As will be discussed shortly, the single-mode PM optical fibers 102 are used in a configuration that, as compared to the prior art, provides: a set of low-noise, low-profile, and low-mass optical paths; increases the data storage capacity per unit volume of system 100; and improves seek and data transfer rates.

Figure 2:
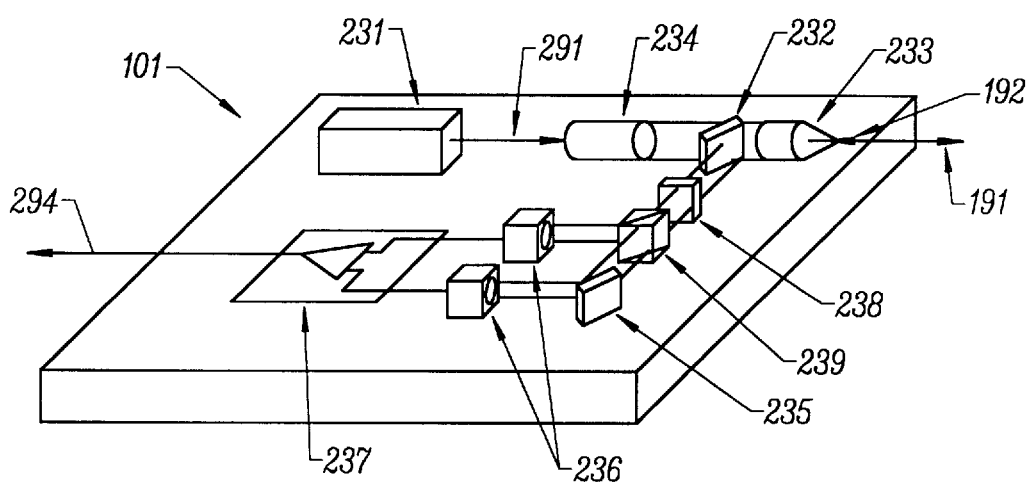
FIG. 2 is a diagram showing the laser-optics assembly of the magneto-optical data storage and retrieval system of FIG. 1.

FIG. 2 is a diagram showing the laser-optics assembly of the magneto-optical data storage and retrieval system of FIG. 1. In FIG. 2, the laser-optics assembly 101 is shown to include a linearly polarized RF modulated laser source 231 operating in a visible or near ultraviolet frequency region and emitting an optical power in the range from 30 to 50 mw. Laser-optics assembly 101 further includes: a collimating optics 234, a low wavelength dispersion leaky beam splitter 232, and a coupling lens 233. In the preferred embodiment, laser-optics assembly 101 directs (from the linearly polarized laser source 231) a linearly polarized outgoing laser beam 191 (shown in FIG. 1) towards the optical switch 104. Laser-optics assembly 101 further includes: a ¼ wave plate 238, a mirror 235, and a polarizing beam splitter 232. In the preferred embodiment, a linearly polarized reflected laser beam 192 (shown in FIG. 1) is directed by the optical switch 104 to the coupling lens 233, and is routed by the leaky beam splitter 232 to a differential detector comprising: the ¼ wave plate 238, the mirror 235, and the polarizing beam splitter 239. As is well established in the art, this type of differential detection scheme measures the optical power in two orthogonal polarization components of the reflected laser beam 192, with a differential signal being a sensitive measure of polarization rotation induced by the Kerr effect at the surface of one of the set of spinning MO disks 107. In the preferred embodiment, after conversion by a set of photodiodes 236, the differential signal is processed by the differential amplifier 237 and is output as signal 294. While the preferred embodiment includes one well known arrangement of optical components embodied as the laser-optics assembly 101, those skilled in the art will recognize that the present invention is not meant to be limited to this arrangement, as other techniques for directing the outgoing laser beam 191 and for detecting the reflected laser beam 192 are well known in the art.

Figure 3:
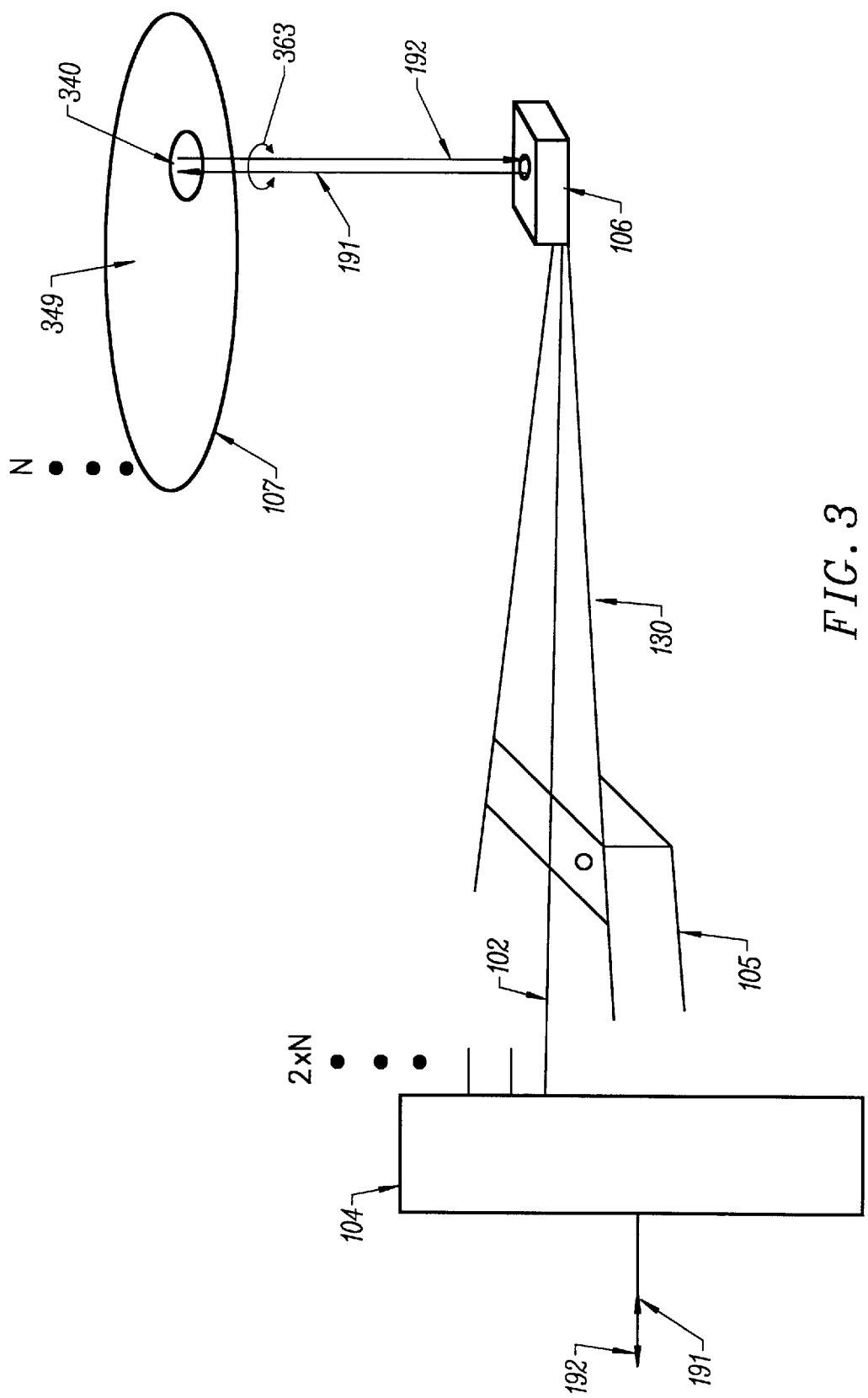
FIG. 3 is a diagram showing an optical path that includes one of the optical fibers and the optical switch of the magneto-optical data storage and retrieval system of FIG. 1.

FIG. 3 is a diagram showing an optical path that includes one of the optical fibers and the optical switch of the magneto-optical data storage and retrieval system of FIG. 1. Those skilled in the art will recognize that the set of optical paths of the present invention may be described with reference to a single optical path, shown in FIG. 3 to include: the optical switch 104, one of the set of single-mode PM optical fibers 102, and one of the set of MO heads 106. In the preferred embodiment, optical switch 104 provides sufficient degrees of selectivity for directing the outgoing laser beam 191 towards a respective proximal end of a respective single-mode PM optical fiber 102. The outgoing laser beam 191 is further directed by the single-mode PM optical fiber 102 to exit a respective distal end so as to pass through the MO head 106 onto a surface recording layer 349 of a respective spinning MO disk 107.

During writing of information, the outgoing laser beam 191 is selectively routed by the optical switch 104 to the spinning MO disk 107 so as to lower a coercivity of the surface recording layer 349 by heating a selected spot of interest 340, preferably in a range depending on the Curie point of the MO recording layer 349. In the preferred embodiment, the optical intensity of outgoing laser beam 191 is held constant, while a time varying vertical bias magnetic field is used to define a pattern of "up" or "down" magnetic domains perpendicular to the spinning MO disk 107. This technique is known as magnetic field modulation (MFM). Alternatively, outgoing laser beam 191 may be modulated in synchronization with the time varying vertical bias magnetic field at the spot of interest 340 in order to better control domain wall locations and reduce jitter. Subsequently, as the selected spot of interest 340 cools at the surface layer 349, information is encoded at the surface of the respective spinning disk 107.

During readout of information, the outgoing laser beam 191 (at a lower intensity compared to writing) is selectively routed to the spinning MO disk 107 such that at any given spot of interest 340, the Kerr effect causes (upon reflection from the surface layer 349) the outgoing laser beam 191 to have a rotated linear polarization of either clockwise or counter clockwise sense (shown as 363) that depends on the magnetic domain polarity at the spot of interest 340.

The aforementioned optical path is bi-directional in nature. Accordingly, the outgoing laser beam 191 is reflected and is received through the MO head 106 as the reflected laser beam 192. In the preferred embodiment, the reflected laser beam 192 enters the distal end of the single-mode PM optical fiber 102, propagates along the single-mode PM optical fiber 102 to exit at its proximal end, and is selectively routed by the optical switch 104 towards the laser-optics assembly 101 for subsequent conversion as signal 294.

Figure 4A:
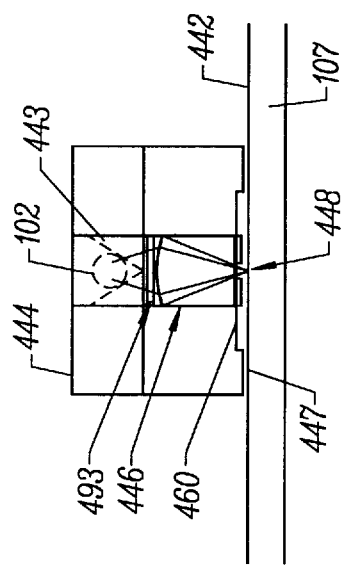
FIGS. 4a–c are diagrams showing the flying magneto-optical head of the magneto-optical data storage and retrieval system of FIG. 1 in a top view, a side cross-sectional view, and a front view.
Figure 4B:
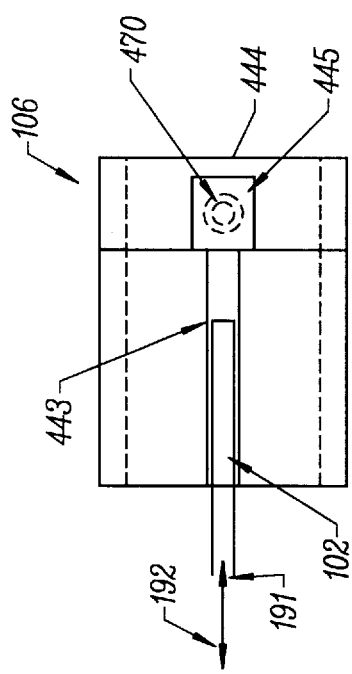
Figure 4C:
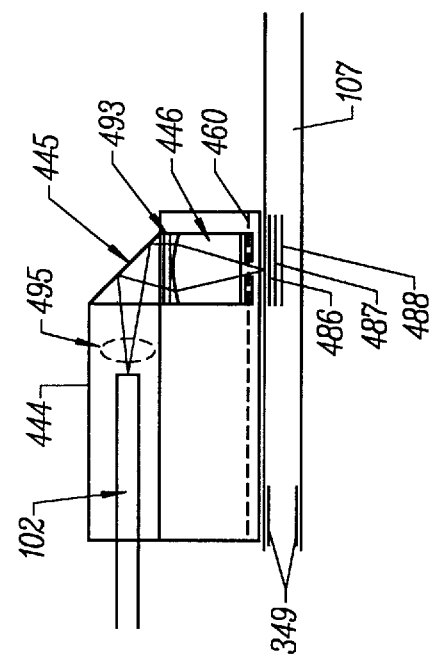

FIGS. 4a–c are diagrams showing the flying magneto-optical head of the magneto-optical data storage and retrieval system of FIG. 1 in a top view, a cross-sectional side view, and a front view, respectively. Those skilled in the art will recognize that the set of flying MO heads of the present invention may be illustrated with reference to a single representative MO head 106, which is shown in FIGS. 4a–c to be positioned respectively above or below a surface recording layer 349 of one of the set of spinning MO disks 107. In the preferred embodiment, the MO head 106 includes: a slider body 444, an air bearing surface 447, a transmissive quarter-wave plate 493, a reflective substrate 445, an objective optics 446, and a magnetic coil 460. In the preferred embodiment, the slider body 444 is dimensioned according to mechanical and optical constraints that include: physical size, numerical aperture (NA), and working distances between the single-mode PM optical fiber 102 and the objective optics 446 and the reflective substrate 445. In the preferred embodiment, reflective substrate 445 may comprise a reflective surface which may be aligned in the optical path at an angle of 45 degrees and which may be embodied as a prism, or in an alternative embodiment, as a mirror as disclosed in commonly assigned U.S. patent application Ser. No. 08/731,214 entitled "Flying Optical Head With Dynamic Mirror" filed on Oct. 10, 1996, which is incorporated herein by reference. While, slider body 444 may include an industry standard "mini", "micro", "nano", or "pico" slider, those skilled in the art will recognize that, as determined by the aforementioned mechanical and optical constraints, alternatively dimensioned slider bodies 444 may also be used. Accordingly, in an exemplary embodiment, slider body 444 has a slider height of approximately 889 um and a planar footprint area that corresponds to that of a nano slider.

In the preferred embodiment, single-mode PM optical fiber 102 is coupled to the MO head 106 and is held centrally along an axis of the slider body 444 by a v-groove 443. In the preferred embodiment, the laser beams 191 and 192 traverse an optical path (to and from surface recording layer 349 of the spinning MO disk 107) that includes: the single-mode PM optical fiber 102, the reflective substrate 445, the quarter-wave plate 493, and the objective optics 446. In the preferred embodiment, the single-mode PM optical fiber 102 is positioned within the v-groove 443 to preferably locate the outgoing laser beam 191 as an optimally focused optical spot 448. The single-mode PM optical fiber 102 may be subsequently secured in place by using an ultraviolet curing epoxy or a similar adhesive. In the preferred embodiment, the reflective substrate 445, the quarter-wave plate 493, and objective optics 446 are sufficiently compact and low mass so as to fit within a physical volume defined approximately by the rectangular dimensions of the slider body 444 and yet sufficiently large to direct a full cross section of the outgoing and reflected laser beams 191 and 192 so that minimal power is lost and significant distortion and aberrations in the outgoing and reflected laser beams 191 and 192 are not introduced. In an exemplary embodiment, the objective optics 446 is a microlens with a numerical aperture (NA) of approximately 0.62. The microlens preferably focuses the optical spot 448 with a full width at half-maximum intensity (FWHM) of approximately 0.57 um +/–2% at a point approximately 450 nm below the air bearing surface 447 of the slider body 444. In the preferred embodiment, the magnetic coil 460 is a small multi-turn coil positioned near the air-bearing surface 447. In an exemplary embodiment, the magnetic coil 460 generates a magnetic field which is approximately 300 Oersteds of either polarity, is reversible (80% +/–full-strength) in a time of 4 ns, and is preferably perpendicular to the plane of the spinning MO disk 107 (+/–15 degrees). Preferably, the magnetic coil 460 should not interfere with the outgoing and reflected laser beams 191 and 192 while the beams pass through the MO head 106 to the spinning MO disk 107, or vice versa.

In the preferred embodiment, movement of the MO head 106 and, consequently, movement of the focused optical spot 448 across the spinning MO disk 107, may be used in storage and retrieval of information, track following, and short seeks from one data track to another data track. In the preferred embodiment, track following may be accomplished by using combined coarse and fine tracking servo techniques. For example, a sampled sector servo format may be used to define tracks. The servo format may include either embossed pits stamped into the spinning MO disk 107 or magnetic domain orientations that are read similar to data marks. If embossed pits are used, those skilled in the art will recognize that the differential output circuit 237 (FIG. 2) may be supplemented with an adder output circuit.

In an alternative embodiment, a linearly adjustable optical element 495 may be included in the optical path (between the single-mode PM optical fiber 102 and the reflective substrate 445) to optically alter the outgoing laser beam 191 as the beam exits the single-mode PM optical fiber 102 so as to permit the optical spot 448 to be focused to include, for example, focal positions 486, 487, and 488. Accordingly, in the aforementioned alternative embodiment, an MO disk 107 that is a multi-layer MO disk may be used. In the aforementioned alternative embodiment, those skilled in the art will recognize that the linearly adjustable optical element 495 may be positioned by a linear micro-machined motor or a piezoelectric transducer (not shown).

In the preferred embodiment, the single-mode PM optical fiber 102 functions as an aperture of a confocal optical system that has a high depth resolution along its optical axis and an improved transverse resolution. The improved transverse resolution improves the detection of smaller magnetic domain orientations as well as detection of magnetic domain edges, as compared to a non confocal system. The high depth resolution minimizes cross-talk between closely spaced surface recording layers when using multi-layer storage media. Another advantage that arises from the confocal nature of the present invention is that stray light reflected from the objective optics 446 is filtered; consequently, anti-reflection coatings on surfaces of the objective optics 446 may not necessarily be required.

Figure 5:
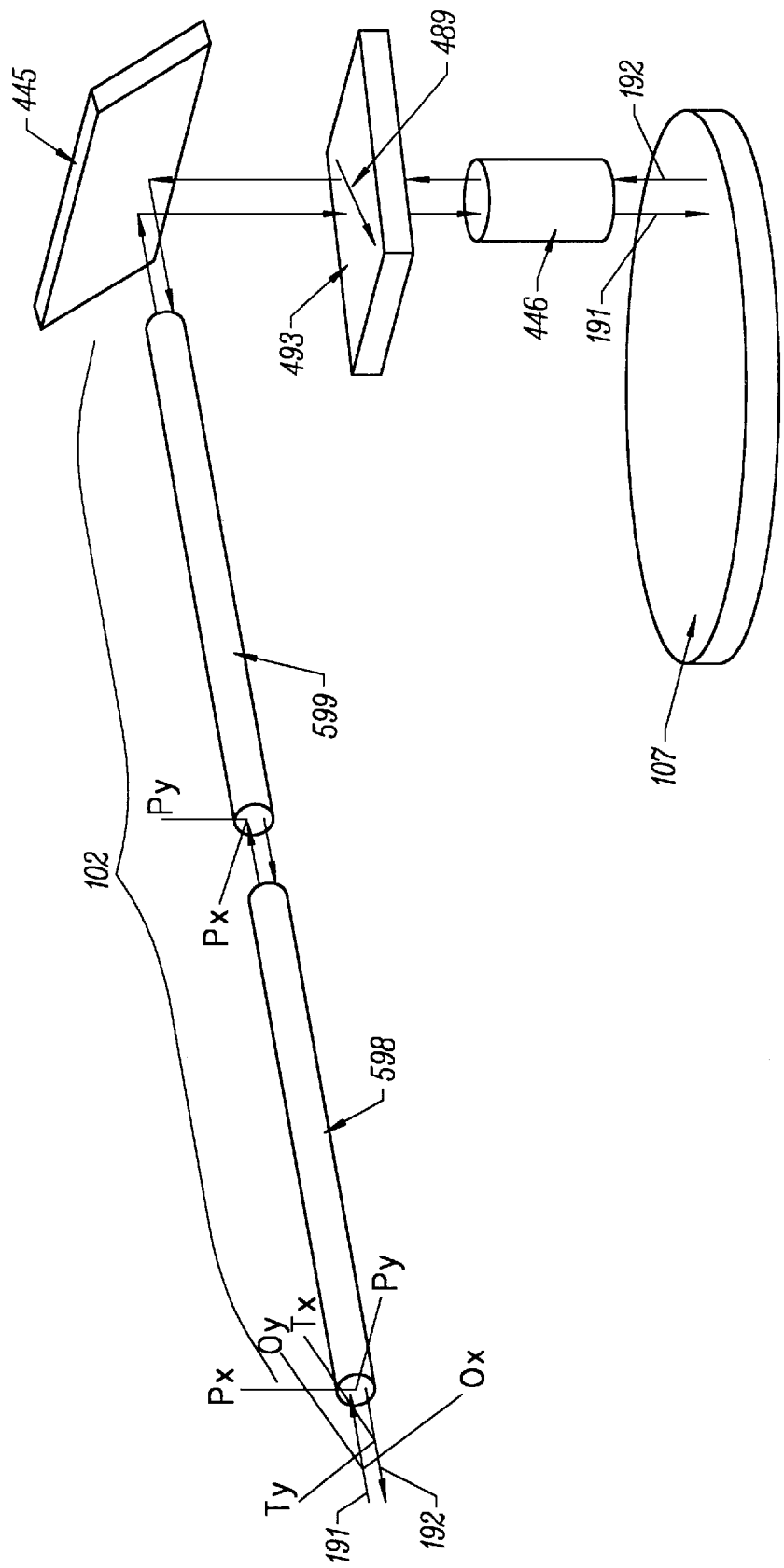
FIG. 5 is a diagram showing a representative optical path.

FIG. 5 is a diagram showing a representative optical path. Those skilled in the art will recognize that the set of optical paths of the present invention may be illustrated with reference to a single representative optical path, which is shown in FIG. 5 to include: the reflective substrate 445, the quarter-wave plate 493, the objective optics 446, and the single-mode PM optical fiber 102. In the preferred embodiment, the single-mode PM optical fiber 102 comprises a first segment 598 coupled to a second segment 599, each segment comprising a fast axis (Px) and slow axis (Py). The fast axis of the first segment 598 is preferably aligned with the slow axis of the second segment 599. In the preferred embodiment, the outgoing laser beam 191 has an Ox component and an Oy component and is preferably linearly polarized at an angle of approximately 45 degrees relative to the Px and Py axes of the first segment 598, and the quarter-wave plate 493 comprises a fast axis 489 which is preferably aligned in the optical path at an angle of 45 degrees relative to the Px and Py axes of the second segment 599. In an exemplary embodiment, the quarter-wave plate 493 comprises a square dimension of about 250 um, a thickness of about 89 um, and a phase retardation of about 90 degrees (+/−3 degrees) at a wavelength of interest.

Those skilled in the art will recognize that the first and second segments 598 and 599 may typically be subject to external and/or internal stresses resulting from: mechanical motion, temperature, and pressure; and that, these stresses may affect optical properties of the first and second segments 598 and 599, for example, their birefringent properties. Accordingly, as the Ox and Oy polarization components propagate through the first and second segments 598 and 599, the Oy component acquires a shift in phase of $\phi$ relative to the Ox component. In the preferred embodiment, the polarization components Ox and Oy exit the distal end of the second segment 599 and are reflected by the reflective substrate 445 so as to be incident with the surface of the quarter-wave plate 493. The Ox and Oy components are preferably reflected equally (within 3% of each other) from a gold surface of the reflective substrate 445. As the Ox and Oy components pass through the quarter-wave plate 493, the Ox component is converted to a left-hand circular polarization, and the Oy component is converted to a right-hand circular polarization, and the two circular polarizations sum to preferably be an outgoing linear polarization having a polarization angle that depends on the phase shift $\phi$. The outgoing linear polarization is reflected from the MO disk 107 and is rotated by the Kerr effect so as to return with a net phase shift between the circular polarization components equal to $\phi+\Delta$, where $\Delta$ is a phase shift introduced by the Kerr effect. The reflection from the MO disk 107 reverses the sense of each circular polarization (i.e., left-hand becomes right-hand and vice-versa), such that, upon a second pass through the quarter-wave plate 493, the right-hand component is converted to a linear polarization component Tx, and the left-hand component is converted to a linear polarization component Ty. The Tx and Ty polarization components of the reflected laser beam 192 are preferably rotated 90 degrees with respect to the Ox and Oy polarization components of the outgoing laser beam 191, and the Tx component exhibits a phase shift of $\phi+\Delta$ relative to the Ty component. Those skilled in the art will recognize that in an exemplary embodiment, in which the optical transit time through the PM optical fiber is less than 5 ns, the birefringence of the PM optical fiber will not change appreciably; thus, as the Tx polarization component of the reflected laser beam 192 propagates back through the second and first segments 599 and 598, the Ty component acquires an additional phase shift of $\phi$ with respect to the Tx component. In this manner, after exiting the proximal end of the first segment 598, the Ty polarization component of the reflected laser beam 192 is phase shifted relative to the Tx polarization component, preferably by only the Kerr phase $\Delta$. The polarization state that emerges from the fiber is elliptical and is converted by the quarter-wave plate 238 of laser-optics assembly 101 to preferably have a linear polarization with a polarization angle proportional to $\Delta$. Subsequently, the linear polarization is detected and converted so as to represent the information stored at the spot of interest 340 as the output signal 294. While the present invention minimizes the effects of birefringence introduced by the first and second segments 598 and 599, those skilled in the art will recognize that the quarter-wave plate 493 also minimizes phase shifts introduced by the optical properties of the reflective surface of the reflective substrate 445. Additionally, while the quarter-wave plate 493 is disclosed to be positioned in the optical path after the reflective substrate 445, those skilled in the art will recognize that in an alternative embodiment, the quarter-wave plate 493 may be positioned between the objective optics 446 and the MO disk 107.

The present invention recognizes that use of a laser source 231 that comprises a RF modulated laser diode may reduce the effects of optical feedback of the reflected laser beam 192 to the laser diode. Those skilled in the art will recognize that RF modulated diodes do not operate at a single wavelength, but rather, as a source of laser light having multimode spectral characteristics (typically with a 10 nm bandwidth). Those skilled in the art will recognize that for each $\lambda$, a phase shift $\phi$ may occur. Accordingly, in the preferred embodiment, for each $\lambda$, the corresponding phase shift may be minimized by specifying the quarter-wave plate 493 to operate over the bandwidth of the laser source 231. However, those skilled in the art will recognize that when the Ox and Oy components of the outgoing laser beam 191 are not optimally aligned at 45 degrees relative to the Px and Py axes of the first segment 598, and/or the quarter-wave plate 493 is not exactly quarter-wave, and/or other optical components in the optical path are not aligned, the phase shift $\phi$ and, thus, the RF noise components it generates in the output signal 294 may exhibit a dependence on the wavelength fluctuations of the laser source 231. Accordingly, because in practice the optical components of system 100 may be aligned to only a limited degree of precision, the wavelength fluctuations of the RF-modulated laser source 231 may function to degrade the signal-to-noise ratio of the output signal 294.

The present invention identifies that by rotating the fast axis of the first segment 598 orthogonally to the fast axis of the second segment 599, the RF phase noise created by wavelength fluctuations of the laser source 231 may be canceled in a common mode manner. In the preferred embodiment, the first and second segments 598 and 599 may comprise commercially available single-mode PM optical fiber selected to operate at the frequency of interest. In the preferred embodiment, the first segment 598 is coupled to the second segment 599 using fusion splicing techniques that are well known in the art, and the fast axis of the first segment 598 is aligned with the slow axis of the second segment 599, preferably to within an angle of less than 0.5 degree. Additionally, the first and the second segments 598 and 599 are preferably selected from the same optical fiber manufacturing batch and are preferably of equal length to a precision of less than 1 mm. Those skilled in the art will understand that the phase shift encountered by a linearly polarized light propagating with a wavelength $\lambda$ through each of the first and second segments 598 and 599 is proportional to $2\pi bL/\lambda$ (where b is the birefringence of the PM optical fiber and L is the PM optical fiber length). Therefore, fluctuations in the wavelength $\lambda$ yield corresponding fluctuations in the phase shift. By aligning the fast axes of the first and second segments 598 and 599 of the PM optical fiber 102 orthogonally to each other and by selecting the two segments 598 and 599 to be approximately equal in length, the present invention identifies that the net birefringence introduced in the optical path by the two segments will be approximately zero and, thus, the phase shift φ will be approximately zero and independent of wavelength. In practice, the non-zero net birefringence will be proportional to the difference between the lengths of the first and the second segments 598 and 599, hence, as compared to the prior art, the RF phase noise in the output signal 294 will be reduced. In an exemplary embodiment, as compared to an embodiment (not shown) in which a continuous one meter in length PM optical fiber is used in place of the first and second segments 598 and 599 of the present invention, the signal-to-noise ratio of the output signal 294 is reduced approximately 40 dB.

Figure 6:
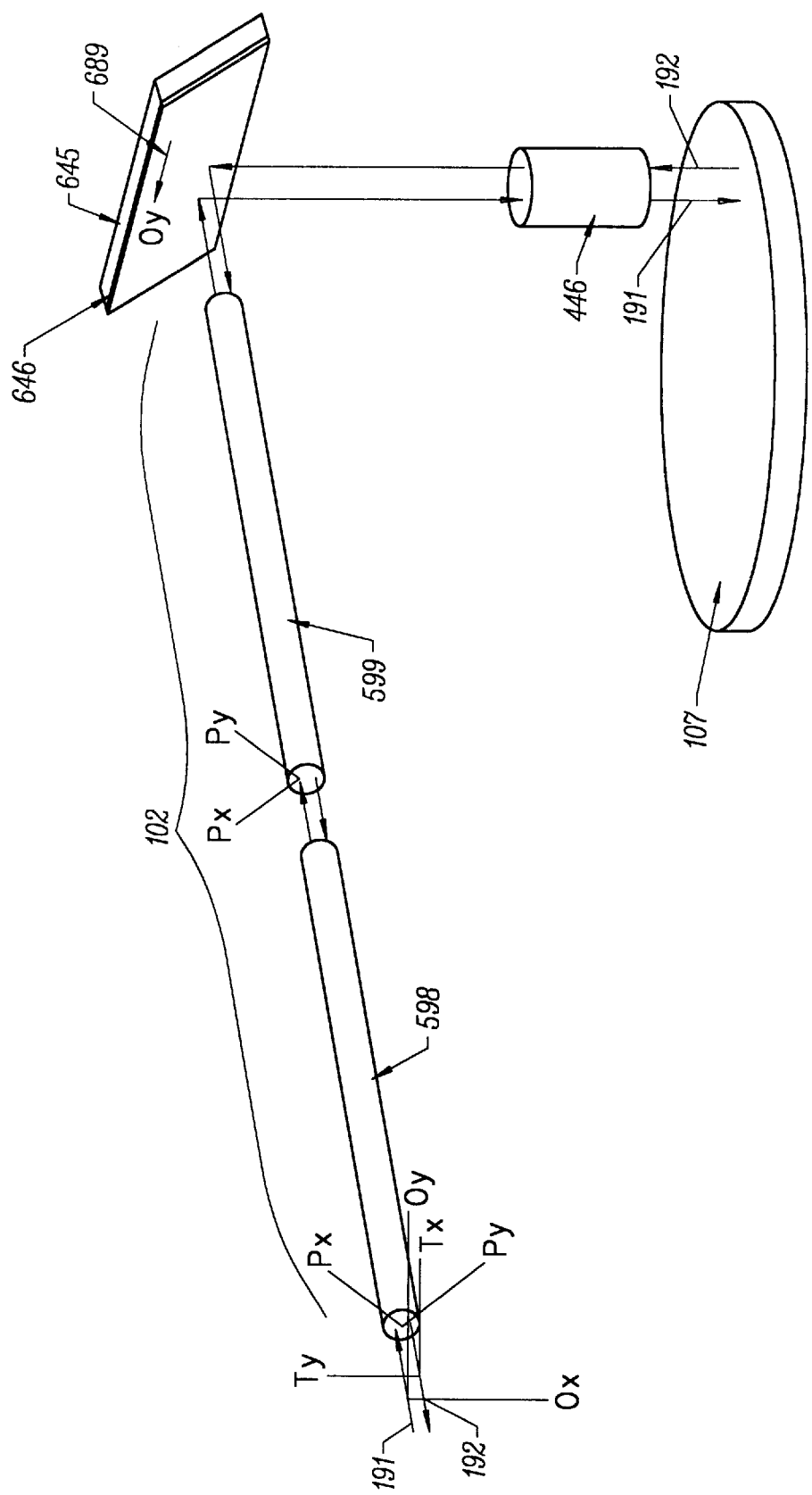
FIG. 6 is a diagram showing a representative optical path in an alternative embodiment.

FIG. 6 is a diagram showing a representative optical path in an second embodiment. In the second embodiment shown in FIG. 6, a multi-layer stack 646 of alternating layers of ZnS (high refractive index) and $SiO_2$ (low refractive index) materials is deposited on a reflective substrate 645. FIG. 8 illustrates the thickness of the various layers for an exemplary embodiment having a total of 12 layers. In the second embodiment, a thick layer of gold is deposited as a first layer on the reflective substrate 645 to improve reflectivity at low incidence angles. The thickness of the layers is controlled during deposition on the reflective substrate 645 so that mean reflectance from the reflective substrate 645 is preferably greater than 95% and so that, reflected components of a linearly polarized light source incident on the multi-layer stack 646 (within an incidence angle of 45 degrees +/−10 degrees) acquire a phase retardation of 90 degrees (+/−1 degree). Those skilled in the art will recognize that the exemplary embodiment is not meant to be limiting, as other operating wavelengths and different numbers of layers with different thicknesses could be deposited on the reflective substrate 645. Those skilled in the art will recognize that the multi-layer stack 646 functions as a quarter-wave plate and that, the effective fast axis 689 of the quarter-wave plate is preferably aligned in the optical path at an angle of 45 degrees relative to the Px and Py axes of the second segment 599. Accordingly, in the second embodiment, the multi-layers 646 function to reduce birefringence induced phase shifts between the Tx and Ty components of the outgoing laser beam 192. One feature of the second embodiment is that neither phase retardation nor reflectance depends on the azimuth of the incidence because the materials used for the design are preferably not birefringent. Also, by reducing the number of discrete optical components on the MO head 106 (i.e., a separate quarter-wave plate 493), the quarter waveplate multi-layer stack 646 of second embodiment effectuates low mass and low-profile optical paths having fast seek and data transfer rates, and increased data storage capacity per unit volume. While the present invention has been described with reference to one type of polarization altering element (i.e., a quarter-wave plate), those skilled in the art will recognize that with suitable changes in the detection optics of laser optics assembly 101, other types of polarization altering elements could also be used with the first and second segments 598 and 599 of the present invention, for example, a faraday rotator.

Figure 7:
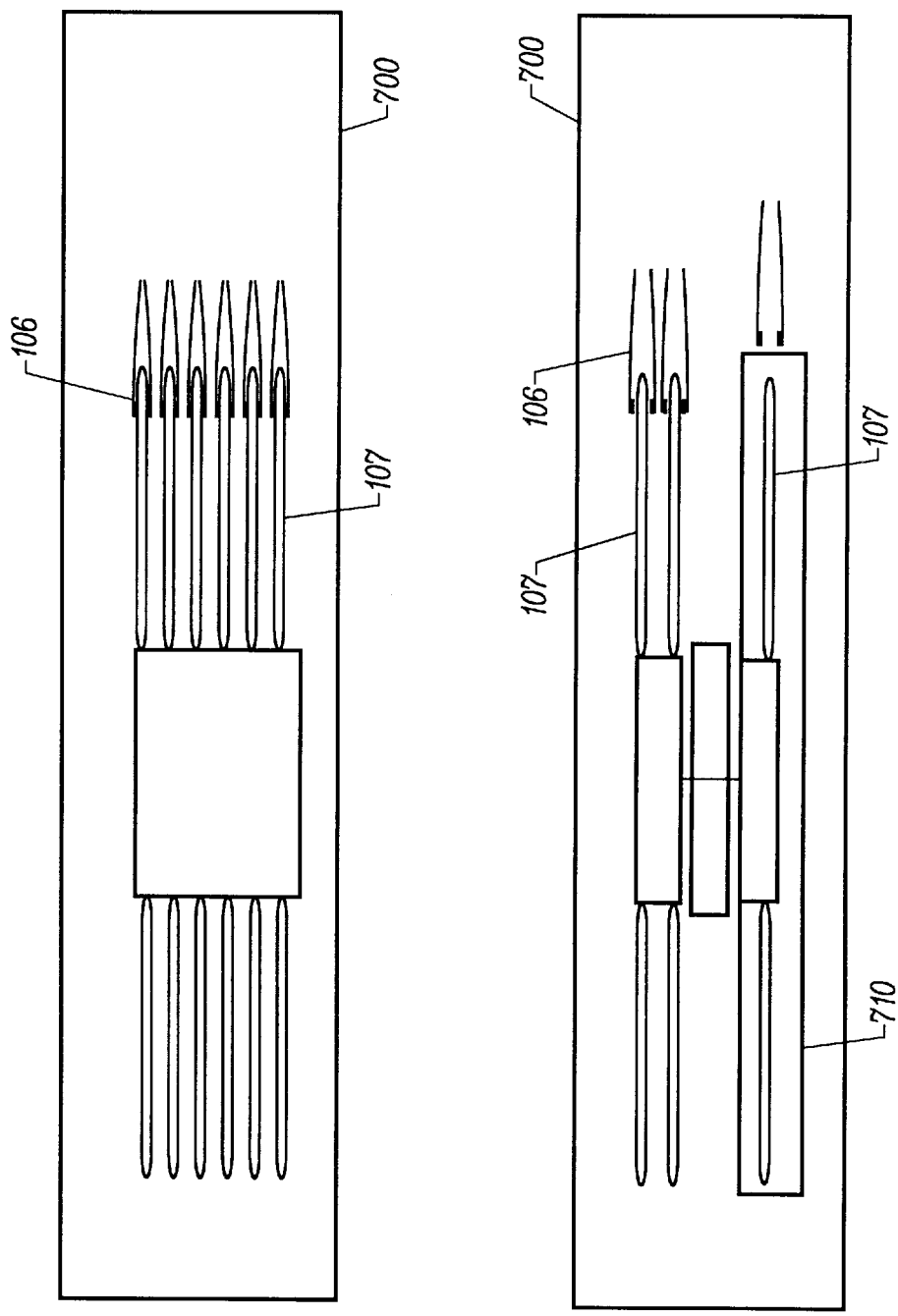
FIG. 7 is a diagram showing a magneto-optical data storage and retrieval system as part of a magneto-optical disk drive.

FIG. 7 is a diagram showing a magneto-optical data storage and retrieval system as part of a magneto-optical disk drive. In the preferred embodiment, the present invention may be used in a compact high-speed and high-capacity MO disk drive 700 that may be an industry standard half-height form factor (1.625 inch) and that includes: six 5.25 inch internal spinning MO disks 107 and twelve flying MO heads 106. The MO disk drive 700 may further include: the optical switch 104 and twelve single-mode PM optical fibers 102. Those skilled in the art will recognize that by providing a set of low noise, low mass, and low profile optical paths to each of the flying MO heads, the MO disk drive 700 may comprise a higher volumetric storage density than is permitted in an equivalent volume of the prior art.

In an alternative embodiment, the half-height form factor MO disk drive 700 may include a removable MO disk cartridge portion 710 and two fixed internal spinning MO disks 107. By providing the removable MO disk cartridge portion 710, the fixed internal and removable combination permits external information to be efficiently delivered to the MO disk drive 700 for subsequent transfer to the internal spinning MO disks 107. The copied information may, subsequently, be recorded back onto the removable MO disk cartridge portion 710 for distribution to other computer systems. In addition, the removable MO disk cartridge portion 710 allows for very convenient and high speed back-up storage of the internal MO spinning disks 107. The fixed internal and removable combination also permits storage of data files on the removable MO disk cartridge portion 710 and system files and software applications on the internal MO spinning disks 107. In another alternative embodiment (not shown), an MO disk drive 700 may include: any number of internal spinning MO disks 107 and/or any number of MO disks 107 within any number of removable MO disk cartridge portions 710.

In another alternative embodiment, information may be conveyed between a set of individual laser-optics assemblies 101 and a set of respective MO spinning disks 107 along optical paths comprising respective individual single-mode PM optical fibers 102 without necessarily requiring the optical switch 104. Alternatively, any number of PM optical fibers 102 may be used to convey laser light along an optical path, for example, by using a PM optical fiber 102 (shown as a dashed line) between the laser-optics assembly 101 and the optical switch 104, and by using a PM optical fiber 102 between the optical switch 104 and one of the flying magneto-optical heads 106. The present invention does not necessarily require use of rotary actuator arms, for example, linear actuator arms may be used. Additionally, the low profile optical paths disclosed by the present invention may be used to convey information to and from a storage location without requiring objective optics (i.e., using a tapered fiber or an optical fiber with a lens formed on an end), and/or reflective substrates, and/or quarter-wave plates, and/or flying magneto-optical heads 106, as for example, in a information communications system that uses fixed optical fibers and fixed storage locations. Accordingly, in routing the set of single-mode PM optical fibers 102, the bend diameter of the optical fibers should preferably be maintained greater than a few hundred times the optical fiber's cladding diameter so as to minimize long-term bending stress degradation.

While the present invention is described as being used in an MO disk drive 700, those skilled in the art will recognize that use of optical fiber technology, as described with reference to FIGS. 1–8, is applicable to information transfer using other technologies, including compact disks (CDs), digital video disks (DVD), and communication systems. Accordingly, those skilled in the art will recognize that the present invention may be practiced in many different environments and many different embodiments, for example, with other types of laser sources, with other types of optical fibers, with other types of elements, and/or with other types of polarization altering elements, and should be limited only by the scope of the ensuing claims.

What is claimed is:

1. An optical system for transmission of light between a source and a destination, said optical system comprising:
an optical path for propagation of said light between said source and said destination, said optical path positioned between said source and said destination, said optical path comprising a first optical coupler, said first optical coupler comprising a first segment and a second segment, said first and second segment each comprising a proximal end and a distal end, said first segment comprising a fast axis, said second segment comprising a fast axis, wherein said fast axis of said first segment is aligned in said optical path substantially orthogonal to said fast axis of said second segment.

2. The optical system as recited in claim 1, wherein said first segment comprises a first length, wherein said second segment comprises a second length, and wherein said first length is substantially equal in length to said second length, and wherein said first segment is coupled to said second segment.

3. The optical system as recited in claim 2, wherein said destination comprises a magneto-optical destination.

4. The optical system as recited in claim 2, wherein said first segment and said second segment further comprise a single-mode polarization maintaining optical fiber, and wherein said source comprises a RF modulated laser source.

5. The optical system as recited in claim 1, further comprising an assembly, wherein said assembly is coupled to said optical path, wherein said proximal end of first segment receives said light from said source, wherein said first segment directs said light to exit said distal end of said first segment, wherein said proximal end of said second segment receives said light from said distal end of said first segment, wherein said second segment directs said light to exit said distal end of said second segment, wherein said optical path is positioned by said assembly to convey said light exiting said distal end of said second segment to impinge on said destination, wherein said optical path is positioned by said assembly to receive said light impinging on said destination as a reflected light from said destination at said distal end of said second segment, wherein said reflected light received at said distal end of said second segment is directed by said second segment to exit said proximal end of said second segment, wherein said distal end of first segment receives said reflected light exiting said proximal end of said second segment, and wherein said first segment directs said reflected light to exit said proximal end of said first segment.

6. The optical system as recited in claim 5, further comprising an optical element that alters a polarization property of said impinging light and said reflected light, said optical element aligned in said optical path between said destination and said source.

7. The optical system as recited in claim 6, wherein said optical element comprises a quarter-wave plate.

8. The optical system as recited in claim 7, wherein said quarter-wave plate is aligned in said optical path between said second segment and said destination.

9. The optical system as recited in claim 8, wherein said assembly comprises a flying magneto-optical head, said flying magneto-optical head comprising a reflective substrate and an objective element, wherein said objective element is aligned in said optical path between said reflective substrate and said destination, and wherein said reflective substrate is aligned in said optical path between said second segment and said objective element.

10. The optical system as recited in claim 9, wherein said quarter-wave plate is further aligned in said optical path between said reflective substrate and said objective element.

11. The optical system as recited in claim 10, wherein said quarter-wave plate is deposited on said reflective substrate.

12. The optical system as recited in claim 9, wherein said quarter-wave plate is further aligned in said optical path between said objective element and said destination.

13. The optical system as recited in claim 5, wherein said optical path further comprises a selected one of a set of respective second optical couplers, said one of said set of respective second optical couplers comprising a respective third segment and a respective fourth segment, said respective third segment and said respective fourth segment further comprising a proximal end and a distal end and a fast axis, said distal end of said respective third segment and said proximal end of said respective fourth segment aligned in said optical path in a manner such that said fast axis of said respective third segment is substantially orthogonal to said fast axis of said respective fourth segment.

14. The optical system as recited in claim 13, further comprising an optical switch, wherein said optical switch is coupled to said second segment so as to receive said light exiting said distal end of said second segment, said optical switch further coupled to said set of second optical couplers, said optical switch directing said light to selectively enter said selected one of said set of respective second optical fibers at said proximal end of said respective third segment, said light directed by said respective third segment to exit said distal end of said respective third segment, said light exiting said distal end of said respective third segment received at said proximal end of said respective fourth segment, said light directed by said respective fourth segment to exit said distal end of said respective fourth segment as said light impinging on said destination, said light impinging on said destination received at said distal end of said respective fourth segment as said reflected light, said reflected light directed by said respective fourth segment to exit said proximal end of said respective fourth segment, said reflected light exiting said proximal end of said respective fourth segment received by said distal end of said respective third segment, said reflected light received at said distal end of said respective third segment directed by said respective third segment to exit said proximal end of said respective third segment, and wherein said optical switch selectively directs said reflected light exiting from said proximal end of said respective third segment so as to enter said distal end of said second segment.

15. The optical system as recited in claim 13, wherein said destination comprises a set of magneto-optical storage disks.

16. The optical system as recited in claim 13, wherein said first segment comprises a first length, wherein said second segment comprises a second length, wherein said first length is substantially equal to said second length, wherein said respective third segment comprises a respective third length, wherein said respective fourth segment comprises a respective fourth length, and wherein said respective third length is substantially equal in length to said respective fourth length.

17. The optical system as recited in claim 13, wherein said first optical coupler and said set of respective second optical couplers comprise single-mode polarization maintaining optical fibers, and wherein said source comprises a RF modulated laser source.

18. The optical system as recited in claim 15, further comprising a removable portion, wherein said set of magneto-optical storage disks comprise a set of double sided magneto-optical storage disks, and wherein said removable portion comprises at least a one of said set of double sided magneto-optical rotating storage disks.

19. The optical system as recited in claim 15, further comprising a removable portion, wherein said set of magneto-optical storage disks comprise a set of double sided magneto-optical storage disks, and wherein said removable portion comprises at least a two of said set of double sided rotating magneto-optical storage disks.

20. The optical system as recited in claim 15, wherein said set of double sided magneto-optical storage disks comprises at least six double sided magneto-optical storage disks, and wherein said at least six double sided magneto-optical storage disks are disposed within a half-height form factor.

21. The optical system as recited in claim 15, wherein said optical system further comprises a set of respective flying magneto-optical heads, wherein a one of said set of respective flying magneto-optical heads is coupled with said selected one of said set of said respective second optical couplers.

22. The optical system as recited in claim 21, wherein said one of said set of respective flying magneto-optical heads further comprises a respective quarter-wave plate, a respective reflective substrate, and a respective optical element, wherein said respective quarter-wave plate and said respective optical element are positioned in said optical path to be between said distal end of said respective fourth segment and a respective one of said set of magneto-optical storage disks, and wherein said respective reflective substrate is positioned in said optical path between said distal end of said respective fourth segment and said respective optical element.

23. The optical system as recited in claim 22, wherein said respective quarter-wave plate is positioned to be between said respective optical element and said respective reflective substrate.

24. The optical system as recited in claim 23, wherein said respective quarter-wave plates comprises multi-layers, and wherein said multi-layers are deposited on said respective reflective substrate.

25. The optical system as recited in claim 22, wherein said respective quarter-wave plate is positioned between said respective optical element and said respective one of said set of magneto-optical storage disks.

26. A method of transmission of a light from a source to a storage medium, and for transmission of a reflection of said light from said storage medium to said source, comprising the steps of:

providing an optical fiber that comprises a first segment and a second segment, wherein said first and second segment each comprise a fast axis, wherein said first segment comprises a first length, wherein said second segment comprises a second length, and wherein said first length is substantially equal in length to said second length;

coupling said first and second segments so that said fast axis of said first segment is aligned orthogonal to said fast axis of said second segment;

positioning said optical fiber between said source and said storage medium so that said light passes through said first and second segment onto said storage medium; and positioning said optical fiber between said storage medium and said source so that said reflection of said light from said storage medium passes through said second segment and said first segment.

27. The method as recited in claim 26, further comprising a step of positioning a quarter-wave plate on a flying-magneto-optical so that said light and said reflection of said light passes through said quarter-wave plate.

28. The method as recited in claim 27, wherein said first and said second segments comprise a single-mode polarization maintaining optical fiber, and wherein said source comprises a RF modulated laser source.

29. A single-mode polarization maintaining optical fiber for storage and retrieval of information, wherein said single-mode polarization maintaining optical fiber comprises a first segment and a second segment, said first segment comprising a first length, said second segment comprising a second length, said first length substantially equal in length to said second length, said first and second segment each comprising a proximal end and a distal end, said first segment and said second segment each further comprising a fast axis, said distal end of said first segment coupled to proximal end of said second segment so that said fast axis of said first segment is aligned substantially orthogonal to said fast axis of said second segment.

30. The optical fiber as recited in claim 29, wherein said optical fiber receives said information at said proximal end of said first segment, wherein said first segment and said second segment convey said information so as to exit said distal end of said second segment onto a storage location, wherein said distal end of said second segment receives from said storage location said information, and wherein said second segment and said first segment convey said information so as to exit said proximal end of said first segment.

31. The optical fiber as recited in claim 29, wherein said single-mode polarization maintaining optical fiber is coupled to a flying magneto-optical head.

32. The optical fiber as recited in claim 29, wherein said flying magneto-optical head comprises a quarter-wave plate.

33. An optical system for transmission of light between a source and a set of storage disks, said optical system comprising:

a set of magneto-optical heads, and a set of optical fibers positioned between said source and said set of storage disks, each of said set of optical fibers comprising a first segment coupled to a second segment, each of said first segments and said second segments comprising a proximal end and a distal end, each of said first segments and said second segments further comprising a fast axis, each of said first segments coupled with said second segments so that said fast axis of each of said first segments is aligned substantially orthogonal to said fast axis of each of said second segments, and wherein each of said second segments is coupled to a respective one of said set of magneto-optical heads.

34. The optical system as recited in claim 33, wherein each of said magneto-optical heads comprises a reflective substrate and a quarter-wave plate, each of said quarter-wave plates comprising multi-layers, wherein said multi-layers are deposited on said reflective substrate, and wherein each of said reflective substrates and said quarter-wave plates are positioned in a respective optical path between said source and said set of storage disks.

35. A method of transmission of a light between a source and a destination, comprising the steps of:

providing an optical fiber, said optical fiber comprising a first segment and a second segment, wherein said first and second segment each comprise a fast axis, positioning said optical fiber between said source and said destination so that said light passes through said first and second segments; and aligning said first and second segments so that said fast axis of said first segment is aligned orthogonally to said fast axis of said second segment.

36. The method as recited in claim 35, wherein said first segment comprises a first length, wherein said second segment comprises a second length, and wherein said first length is substantially equal in length to said second length.

37. An optical system for transmission of light between a source and a storage disk, said optical system comprising:

an optical path for propagation of said light between said source and said storage disk;

an optical fiber, wherein said optical fiber is aligned in said optical path, said optical fiber comprising a first segment and a second segment, said first and second segment each comprising a proximal end and a distal end, said first segment and said second segment each further comprising a fast axis, said distal end of said first segment coupled with said proximal end of said second segment so that said fast axis of said first segment is aligned substantially orthogonal to said fast axis of said second segment, wherein said first segment comprises a first length, wherein said second segment comprises as second length, and wherein said first length is substantially equal in length to said second length; and a flying magneto-optical head, said flying magneto-optical head aligned in said optical path, said flying magneto-optical head comprising a reflective substrate and a quarter-wave plate, wherein said reflective substrate and said quarter-wave plate are aligned in said optical path between said source and said storage disk, wherein said quarter-wave plate comprises multi-layers, and wherein said multi-layers are deposited on said reflective substrate.

* * * * *